Patented Nov. 23, 1948

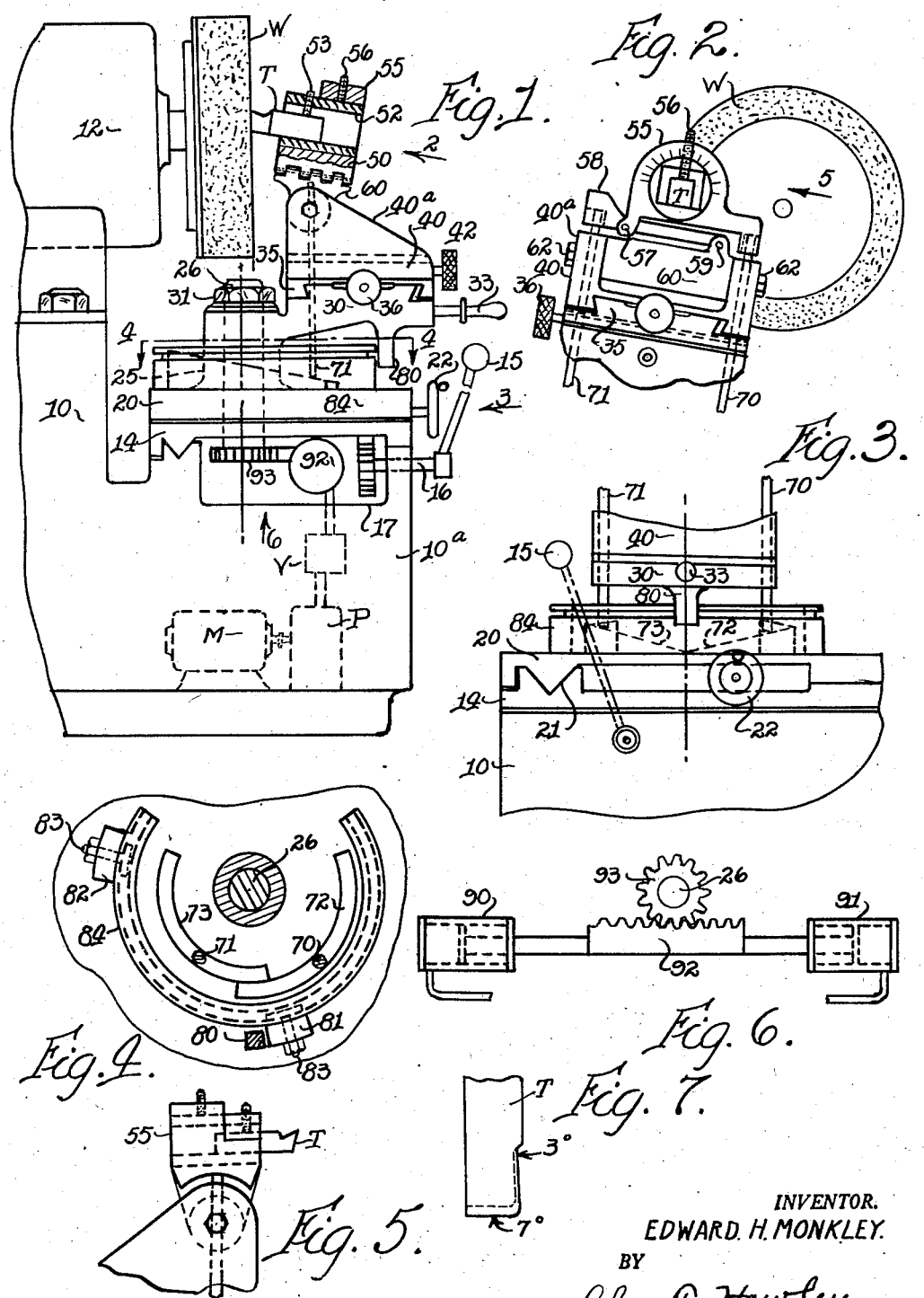

2,454,472

UNITED STATES PATENT OFFICE 2,454,472

TOOL GRINDING FIXTURE

Edward H. Monkley, Worcester, Mass.

Application January 25, 1946, Serial No. 643,373

3 Claims. (Cl. 51—234)

This invention relates to the grinding of angularly related surfaces and more particularly to the grinding of cutting tools having angularly disposed clearance surfaces.

It is the general object of my invention to provide a fixture by which the angle of clearance may be automatically varied as different surfaces of a tool are presented in grinding position. By the use of my improved fixture, a tool having end and side cutting edges with different clearance angles may be ground without resetting the tool and as a continuous operation.

My invention further relates to arrangements and combinations of parts which will be hereinafter described and more particularly pointed out in the appended claims.

A preferred form of the invention is shown in the drawings, in which

Fig. 1 is a partial end elevation of a grinding machine embodying my improvements;

Fig. 2 is a partial front view of the upper part of the fixture, looking in the direction of the arrow 2 in Fig. 1;

Fig. 3 is a partial front view of the lower part of the fixture, looking in the direction of the arrow 3 in Fig. 1;

Fig. 4 is a partial sectional plan view, taken along the line 4—4 in Fig. 1;

Fig. 5 is a detail rear elevation, looking in the direction of the arrow 5 in Fig. 2;

Fig. 6 is a bottom view of certain hydraulic operating mechanism, looking in the direction of the arrow 6 in Fig. 1; and Fig. 7 is a partial plan view of a tool adapted to be ground in my improved fixture.

Referring to the drawings, I have shown parts of a grinding machine including a frame 10 and a grinding wheel W rotated by a motor or other grinding head 12. A table 14 is mounted to slide longitudinally in guideways on a forwardly projecting portion 10a of the frame 10 and may be moved along the guideways by a handle 15 mounted on a shaft 16, which in turn is provided with a gear 17 meshing with a rack on the under side of the table 14.

A carriage 20 is mounted to slide forward and rearward in guideways 21 (Fig. 3) on the table 14 and may be adjusted toward or away from the grinding wheel W by a hand wheel 22 operating through a feed screw and nut of the usual construction. The carriage 20 has a bearing 25 in which an upright stud 26 is freely rotatable.

A support 30 is secured to the upper end of the stud 26 by a nut 31 and is keyed or otherwise secured to swing therewith. A handle 33 projects forward from the support 30 and may be used for swinging the support manually about the axis of the stud 26.

A slide 35 is mounted in guideways on the support 30 and may be moved longitudinally thereon by a hand wheel 36 operating through any usual lead screw and nut. A tool stand 40 is mounted for sliding adjustment forward and rearward in guideways on the slide 35 and may be adjusted toward or away from the wheel W by a hand wheel 42, also operating through the usual lead screw and nut.

A holder 50 is provided for the tool T and preferably comprises a sleeve 52 within which the tool T may be secured by a clamping screw 53. The sleeve 52 is angularly adjustable in a tool head 55 and may be secured in adjusted position by a clamping screw 56. The head 55 is pivoted at 57 (Fig. 2) to a lever 58, which in turn is pivoted at 59 to a block 60.

The block 60 is mounted between upwardly extending side portions 40a of the tool stand 40 and may be secured in angularly adjusted position therein by clamping bolts 62.

The free or right-hand end of the tool head 55 is supported on a rod 70, and the free or left-hand end of the lever 58 is similarly supported on a rod 71. These rods extend downward through guide openings in the tool stand 40 and swinging support 30 and engage cam plates 72 and 73, mounted on the upper surface of the carriage 20 and concentric with the stud 26.

As the support 30 is swung about the axis of the stud 26 during the grinding operation, the rods 70 and 71 will be shifted upward or downward by the cam plates 72 and 73 and will thus vary the angular setting of the tool T with respect to the grinding surface of the wheel W.

The cam plates 72 and 73 are preferably made removable, and suitable plates may be selected to give any desired combination of clearance angles.

A lug 80 projects downward from the support 30 into position for engagement with stops 81 and 82 (Fig. 4) which may be clamped in angularly selected positions by bolts 83 extending into a T-shaped slot in an upright flange 84 on the carriage 20 and enclosing the bearing 25.

As the grinding operation proceeds, the tool support may be swung about the axis of the stud 26 manually by use of the handle 33, or the swinging movement may be produced automatically by hydraulic cylinders 90 and 91 (Fig. 6) which reciprocate a rack bar 92 engaging a gear 93 on the lower end of the stud 26. The cylinders 90 and 91 may be connected to a pump P (Fig. 1) operated by a motor M, and any usual suitable valve mechanism V may be provided for automatically reversing the feed to the cylinders 90 and 91 to effect reciprocation of the rack bar 92.

By the use of my improved fixture, the tool T (Fig. 7) may be given a 7° end clearance and this clearance may be gradually and continuously reduced to a 3° side clearance by the operation of the cam plates 72 and 73 as the support 30 is swung about the axis of the stud 26. The corner of the tool may be rounded by the same motion.

The end clearance angle may be varied as desired by changing the angular setting of the block 60, and the side clearance may be varied by selecting cam plates 72 and 73 having suitable angles to produce the desired clearance. It will thus appear that my improved grinding fixture is extremely flexible and that any desired combination of angles may be readily ground by the use thereof.

Having thus described my invention and the advantages thereof, I do not wish to be limited to the details herein disclosed, otherwise than as set forth in the claims, but what I claim is:

1. A tool grinding fixture comprising a base, a tool holder, a member supporting said holder and mounted to swing about a substantially vertical stationary axis in said base, and means to rock said tool holder in said supporting member in a plane at a slight angle to said vertical axis, said latter means comprising cam plates mounted on said base and concentric with said stationary axis and a pair of actuating rods slidably mounted in said supporting member and engaging said tool holder at their upper ends and said cam plates at their lower ends, and said rods being axially shifted by said cam plates to rock said tool holder as said supporting member is swung about its vertical stationary axis.

2. A tool grinding fixture comprising a tool holder, means to swing said holder about a substantially vertical stationary axis in said fixture, and means to simultaneously swing said tool holder about a second axis at a substantial angle to said stationary axis, and said latter means comprising a lever having a substantially horizontal pivot and on which lever said tool holder is mounted to swing about a second substantially horizontal pivot, and separate cam means to rock said lever and said tool holder in opposite directions as said tool holder is swung in a horizontal plane about said vertical stationary axis.

3. In a tool grinding fixture, a tool head, a lever on which said tool head is pivoted, means to swing said tool head in one direction, and means to simultaneously swing said lever in the opposite direction, the angular shift in position of a tool in said tool head being the differential of said opposite swinging movements, and said two swinging means comprising oppositely disposed cam plates mounted in fixed position in said fixture and actuating devices engaging said cam plates and associated with said tool head and with said lever respectively.

EDWARD H. MONKLEY.

REFERENCES CITED

The following references are of record in the file of this patent:

UNITED STATES PATENTS

| Number | Name | Date |
| --- | --- | --- |
| 571,336 | Budlong | Nov. 17, 1896 |
| 611,323 | Johnston | Sept. 27, 1898 |
| 1,678,413 | Zahringer | July 24, 1928 |
| 2,065,847 | Young | Dec. 29, 1936 |
| 2,202,587 | Kitchen | May 28, 1940 |
| 2,249,699 | Abbott | July 15, 1941 |

FOREIGN PATENTS

| Number | Country | Date |
| --- | --- | --- |
| 518,146 | France | Dec. 27, 1920 |
| 614,010 | France | Sept. 7, 1926 |
| 646,588 | France | July 16, 1928 |